United States Patent

[11] 3,561,397

| [72] | Inventor | Wilhelm Bertram<br>Hans-Cornelius Strasse 125, 8032,<br>Grafelfing, Germany |
|---|---|---|
| [21] | Appl. No. | 665,517 |
| [22] | Filed | Sept. 5, 1967 |
| [45] | Patented | Feb. 9, 1971 |
| [32] | Priority | Sept. 8, 1966 |
| [33] | | Germany |
| [31] | | B88829 |

[54] TUNING INDICATING DEVICE FOR RADIO AND TELEVISION
7 Claims, 5 Drawing Figs.

[52] U.S. Cl. .................................................... 116/124.4,
340/202
[51] Int. Cl. .................................................... H03j 1/02,
G01d 13/10
[50] Field of Search .................................. 116/124.1,
124.3, 124.4; 334/86, 87; 340/202 (Inquired);
324/71, (Inquired); 325/455

[56] References Cited
UNITED STATES PATENTS

| 2,120,136 | 6/1938 | Lyman | 116/124.1X |
| 2,373,168 | 4/1945 | Cockerell | 116/124.1 |
| 2,678,621 | 5/1954 | Proctor, Jr. | 116/124.4 |
| 2,716,962 | 9/1955 | Loewe | 116/124.4 |
| 2,746,419 | 5/1956 | Serge | 334/87X |
| 2,786,142 | 3/1957 | Tyminski et al. | 325/455X |
| 2,907,298 | 10/1959 | Steinke | 116/124.4 |
| 3,149,607 | 9/1964 | Joseph et al. | 334/87X |
| 3,192,494 | 6/1965 | Carlson et al. | 116/124.1X |
| 2,439,201 | 4/1948 | Clark, Jr. | 340/202X |

FOREIGN PATENTS

| 340,259 | 12/1930 | Great Britain | 340/202 |

Primary Examiner—Louis R. Prince
Assistant Examiner—Daniel M. Yasich
Attorney—Woodhams, Blanchard and Flynn ABSTRACT: A device to indicate wavelengths or channels in radio or television apparatus, including a rotary indicating cylinder having a spiral indicating line thereon. The indicating cylinder is driven by means electrically connected to the tuning means of the apparatus. A scale cylinder is outwardly of, and coaxial with, the indicating cylinder. It has a plurality of scales thereon and is selectably driven by the channels or wave band selector for movement past a fixed housing window.

INVENTOR.
WILHELM BERTRAM

INVENTOR.
WILHELM BERTRAM
BY
Woodhams, Blanchard & Flynn
ATTORNEYS

TUNING INDICATING DEVICE FOR RADIO AND TELEVISION

This invention relates to a device for indicating the selection of broadcasting stations or channels in radio and television apparatus, respectively, comprising an indicating member associated with a scale and movable corresponding to the adjustment of a tuning device.

Apparatus of the above-mentioned type have a lighted scale behind which the indicating member is movable in form of a pointer by means of a curved track or drawcord control which cooperates with the adjustable element of the tuning device or its drive. The curved track and also the drawcord controls are exposed to a considerable wear because of the many tuning operations. This results in frequent breakdowns in the indicating devices, the repair of which is often very expensive and not understood by the owner of the apparatus. The reason for the high expense is in the commonly used drawcord controls, the complicated scale cord guide of which, in case the cord breaks, can be reconstructed often only at a considerable expenditure of repair time which, in any case, includes removing of the apparatus from the housing. This is particularly true for radios, the scales of which comprise two or more indicators which are movable independent of one another, said indicators being for example provided for the AM/FM areas. Furthermore, the scale cords being under spring tension often stretch after a more or less long use in spite of the required careful maintenance of the roller guide of said scale cords and this adversely affects the indicating accuracy appreciably.

It is therefore the purpose of the invention to construct a structurally simple and space saving device of the above-mentioned type, said device assuring an exact indication over a long period of use and having no troublesome features and requiring no service. To attain said purpose the invention provides that the indicating member can be driven by the rotary system of a measuring instrument which is positioned in a circuit of the apparatus, said circuit being controlled by the adjustment of the tuning device.

The indicating member of the device of this invention can be coupled with the rotary system of the measuring instrument without the interposition of a curved track or a drawcord, which makes possible a space saving and structurally simple construction of the indicating apparatus. Since there are no tensioned parts or parts with the danger of breakage, an almost unlimited time of use with a most precise indicating exactness is assured.

A preferred embodiment of the invention provides an indicating member in form of a circular cylinder with an indicating mark extending helically along the cylinder jacket, said circular cylinder being coupled with a rotary system and being arranged axially rotatably parallel to and behind the elongated scale. Said indicating mark can be observed through an elongated window opening of the scale, said opening extending parallel to the cylinder axis directly adjacent the cylinder jacket. An indicating member of such a construction allows a considerable expansion of the scale and its scale markings which simplifies the accurate reading of the device.

As a result of the construction, it is advantageous if the scale is rotatably arranged in form of a scale mask or scale screen at a small distance from the circular cylinder opposite the axis of said cylinder, is coupled with the wave band or channel switch of the tuning device and is provided with a number of window openings corresponding to the number of wave or channel bands, said window openings having scale markings on both longitudinal sides associated therewith. A particularly good view of the indicating device is assured by the window openings in connection with the aforementioned scale expansion, which openings are associated with the respective channel or wave bands and which provide the desired scale markings. Said indicating device makes it easy to find the desired station or channel.

It is particularly advantageous in this connection if the scale mask is coupled with the wave band or channel switch in a way that only the scale markings and the window openings associated therewith can be seen through a windowlike recess in the instrument housing, said scale markings corresponding to the selected wave or channel band. This considerably simplifies the selection of the desired wave or channel band without requiring additional indicating elements.

It is further advantageous if adjusting or braking elements engage the scale mask, said adjusting elements determining the position of the window openings in the windowlike recess of the instrument housing. Said elements assure a good view of the window opening together with its scale markings through the windowlike recess.

In the aforementioned preferred embodiment of the invention, the scale mask is formed by a hollow cylinder. However, said scale mask can also have the shape of a hollow polygon which latter has the window openings on the lateral surfaces. Such a scale mask is inexpensive and can be manufactured in large numbers from thin-walled plastic material so that a very light but strong construction of the indicating device is obtained particularly when the circular cylinder is also formed of a thin-walled tube. Advantageously, a material is chosen here which has the same thermal expansion coefficient as the material of the scale mask. Thus, measuring errors which could arise from unequal thermal expansion are prevented.

A compact space saving structure of the indicating device is obtained particularly if the scale mask and the circular cylinder and the rotary system of the measuring instrument are arranged in one common housing. An indicating unit constructed in this manner can be installed easily and quickly in each radio or television apparatus.

The circular cylinder forming the indicating member of the device can be coupled either directly with the axis of the rotary system or can be driven by same through a gear drive. This makes possible the choice of a desired relation between the angle of deflection of the measuring instrument and the indicating rotation of the circular cylinder.

If a gear drive is provided between the rotary system and the circular cylinder it is advantageous if the latter is biased by a spring (not shown in the drawing) in one direction of rotation. Said spring compensates for gear backlash and assures a great exactness in reading. The latter can be further improved if the scale markings of each window opening are slightly offset in opposite directions with respect to the indicating mark of the circular cylinder associated therewith. This allows a very delicately stepped station or channel selection.

A further embodiment of the indicating device provides a general illumination of the scale mask on said indicating device.

The invention is discussed more in detail in connection with the enclosed drawings, wherein.

Figure 1:
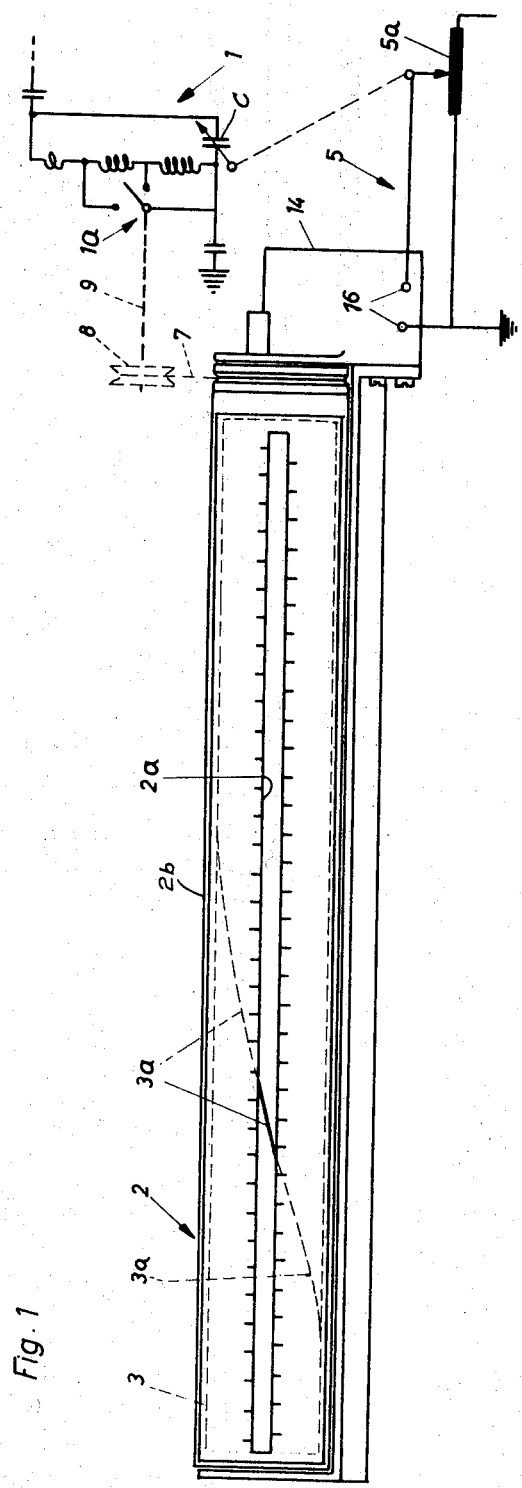
FIG. 1 is a schematically illustrated side-elevational view of an indicating device according to the invention.

The schematic illustration according to FIG. 1 shows a device for indicating the selection of broadcasting stations or channels in a radio which has a grid circuit 1 which can be tuned capacitatively, said grid circuit, for example, being connected to the first HF-intermediate circuit (not illustrated). Said grid circuit 1 forms together with a channel or a wave band switch 1a, a tuning device, according to the adjustment of which an indicating member 3 can be moved which is associated with a scale 2 and which will be disclosed later in the specification.

According to the invention, the indicating member 3 can be driven by the rotary system of an electrical measuring instrument or positioning means, such as a millimeter 4 which is provided in a circuit 5 of the radio, said circuit being controlled by the adjustment of the tuning device 1, 1a.

Figure 2:
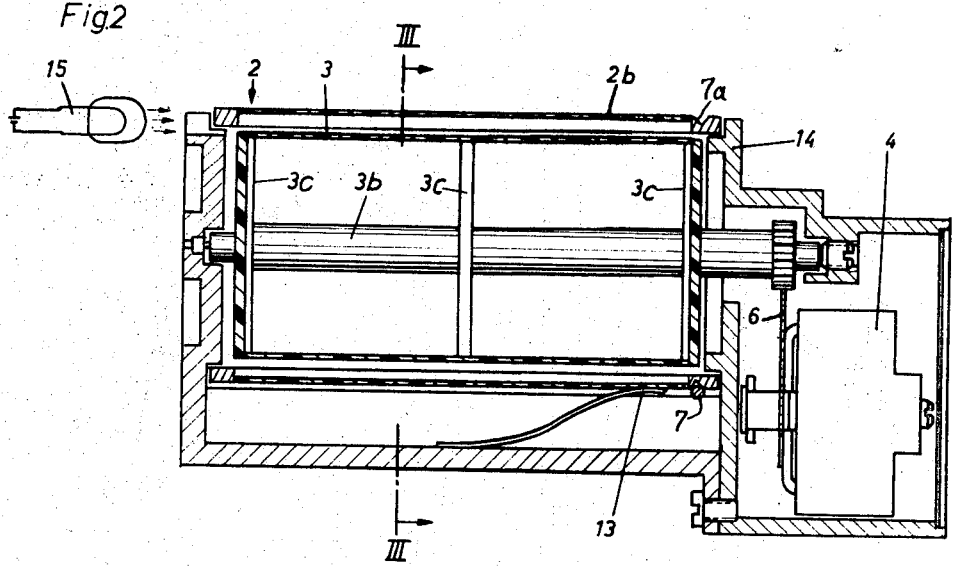
FIG. 2 is a longitudinal cross-sectional view of the indicating device according to FIG. 1 on an enlarged scale.

As can be understood from FIG. 1 and particularly from FIG. 2, the indicating member 3 has the shape of a preferably hollow circular cylinder which is rotatable around its axis and is arranged parallel to and behind the elongated scale 2. In the illustrated embodiment of the device the circular cylinder 3 is coupled with the rotary system of the electrical measuring instrument 4 by means of a gear drive 6 and can be biased in one direction of rotation by a spring (not illustrated).

The The circular cylinder 3 advantageously is formed by a thin-walled plastic tube which is supported with respect to the cylinder shaft 3b by spokes or discs 3c located at least at the end portions of said plastic tube.

To eliminate measuring mistakes caused by heat expansion, the scale 2 is manufactured either of the same plastic as used for the circular cylinder 3 or is manufactured of material equivalent to said plastic with respect to the thermal expansion coefficient.

Figure 3:
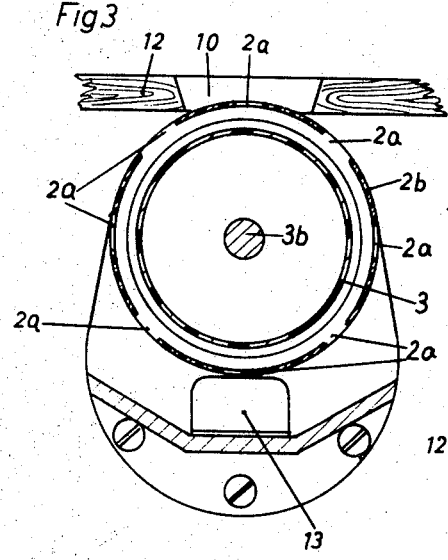
FIG. 3 is a cross-sectional view along the lines III—III of FIG. 2.

The scale is constructed in form of a scale screen which has the shape of a hollow cylinder according to the embodiment of FIGS. 2 and 3, said hollow cylinder being arranged rotatably at a small distance outwardly from said circular cylinder 3 opposite its shaft 3b.

Figure 4:
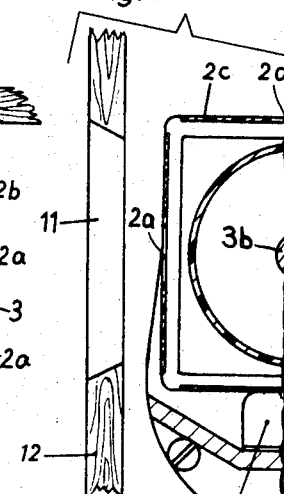
FIG. 4 illustrates a partial vertical cross-sectional view of a modified embodiment of the indicating device of the invention.
Figure 5:
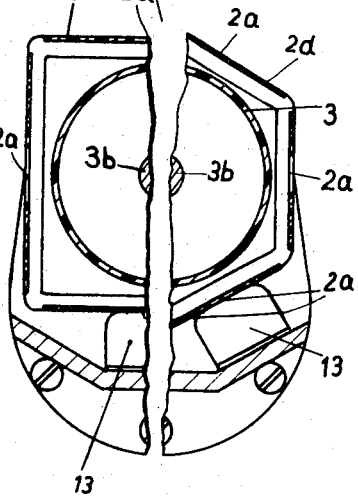
FIG. 5 illustrates a partial vertical cross-sectional view of a further modified embodiment of the indicating device of the invention.

Suitable coupling elements 7, 8, 9 (schematically indicated in dotted lines in FIG. 1) are provided, the element 7 being a cable interconnecting the rotatable scale screen 2b to a pulley 8, which cable 7 is received in a groove 7a (FIG. 2) on the scale screen. The pulley 8 is fixedly connected to a rotatable rod 9 which is rotated by a conventional selector switch 1a so as to make it possible for the scale screen 2b (or scale screens 2c or 2d of FIG. 4) to be coupled with the channel or wave band switch 1a of the tuning device. The scale screen 26 is provided with a number of window openings 2a corresponding to the number of wave or channel bands on the switch 1a, as is clearly illustrated in FIGS. 3 and 4. FIG. 4 also illustrates the possibility of constructing the scale screen in form of a hollow polygon 2c or 2d having the window openings 2a at its lateral surfaces.

Each one of the window openings 2a allows one to observe an indicating mark 3a which according to FIG. 1 extends helically on the outer jacket of the circular cylinder 3, said indicating mark intersecting scale markings provided on the longitudinal edges of each one of the window openings 2a. Said scale markings are slightly offset in opposite directions with respect to the particular indicating mark 3a intersecting said scale markings.

The scale screen 2b or 2c or 2d is coupled with the channel or wave band switch 1a by the coupling elements 7, 8, 9 (referred to above) in a way that only the scale markings corresponding to the single wave or channel bands together with the respective window opening 2a can be seen in the manner illustrated by FIGS. 3 and 4 through a windowlike recess 10 or 11 in the apparatus housing 12. The correct position of the window opening 2a corresponding to the selected wave or channel band in the windowlike recess 10 or 11 of the apparatus housing 12 is determined by at least one adjusting or braking element engaging with scale screen 2b or 2c or 2d, said adjusting or braking element for example having the form of an adjusting spring 13.

The indicating cylinder 3 and the scale mask 2b or 2c or 2d are arranged together with the electrical measuring instrument 4 and the gear drive 6 in a common housing 14 which housing can be provided with a source 15 of illumination for the respective scale screen 2b or 2c or 2d in use.

In the illustrated embodiment of the device the circuit 5, which has arranged therein the electrical measuring instrument 4 connected to the contact clamps 16 of the housing, comprises a potentiometer 5a which, as indicated in dotted lines in FIG. 1, is coupled with the adjustable element C of the grid circuit 1. A constant tapped voltage of the radio or television apparatus is used as a supply voltage of the circuit 5.

The invention, in particular with respect to the circuit 5 which is controlled by the adjustment of the tuning device 1, 1a is not limited to the embodiment illustrated in the drawings. Furthermore all characteristics and structural details disclosed in the drawings and the corresponding disclosure can be of importance to the invention alone or in any desired combination.

I claim:

1. A tuning-indicating device for radios and televisions comprising an indicating cylinder drivable corresponding to the adjustment of a tuning apparatus, an elongated scale mask having scale indicia thereon, said indicating cylinder being supported for rotation closely behind said elongated scale mask, an indicating mark extending helically on said indicating cylinder and movable therewith, said indicating cylinder being located in close relationship to said scale indicia so that said indicating mark and said scale indicia are simultaneously visible, positioning means having a rotatable member, gearing coupled to said rotatable member and said indicating cylinder to rotate said indicating cylinder upon a rotation of said rotatable member, said positioning means being free of any mechanical connection to said tuning apparatus, means for coupling said positioning means to said tuning apparatus whereby said indicating cylinder indicates the adjusted position of said positioning means, said scale mask being supported for movement, said scale mask comprising a plurality of elongated and parallel window openings therein extending the length thereof and laterally spaced from each other, said scale mask being shiftable so as to move said window openings transversely of their width.

2. A device according to claim 1, wherein said scale mask is of a multisided member, each side surface of which is provided with one of said window openings.

3. A device according to claim 1, wherein said scale mask is formed of a cylinder having a plurality of said elongated window openings therein.

4. A device according to claim 1, wherein said indicating cylinder, said scale mask and said positioning means are arranged in one common housing.

5. A device according to claim 1, wherein said indicating cylinder is formed of a thin-walled tube of material having the same thermal expansion coefficient as the material of the scale mask.

6. A device according to claim 1, including a braking element engaging the scale mask, said braking element maintaining said scale mask in an adjustable but fixed position to fixedly locate said window openings relative to said indicating cylinder.

7. A device according to claim 1, including scale markings on to both longitudinal edges of said window openings; and wherein said scale markings of each window opening are slightly offset in opposite directions with respect to said indicating mark on said indicating cylinder.